No. 615,667. Patented Dec. 13, 1898.
C. S. BARNETT.
APPARATUS FOR CLEANING OR SEPARATING SAND AND GRAVEL.
(Application filed May 26, 1898.)
(No Model.)
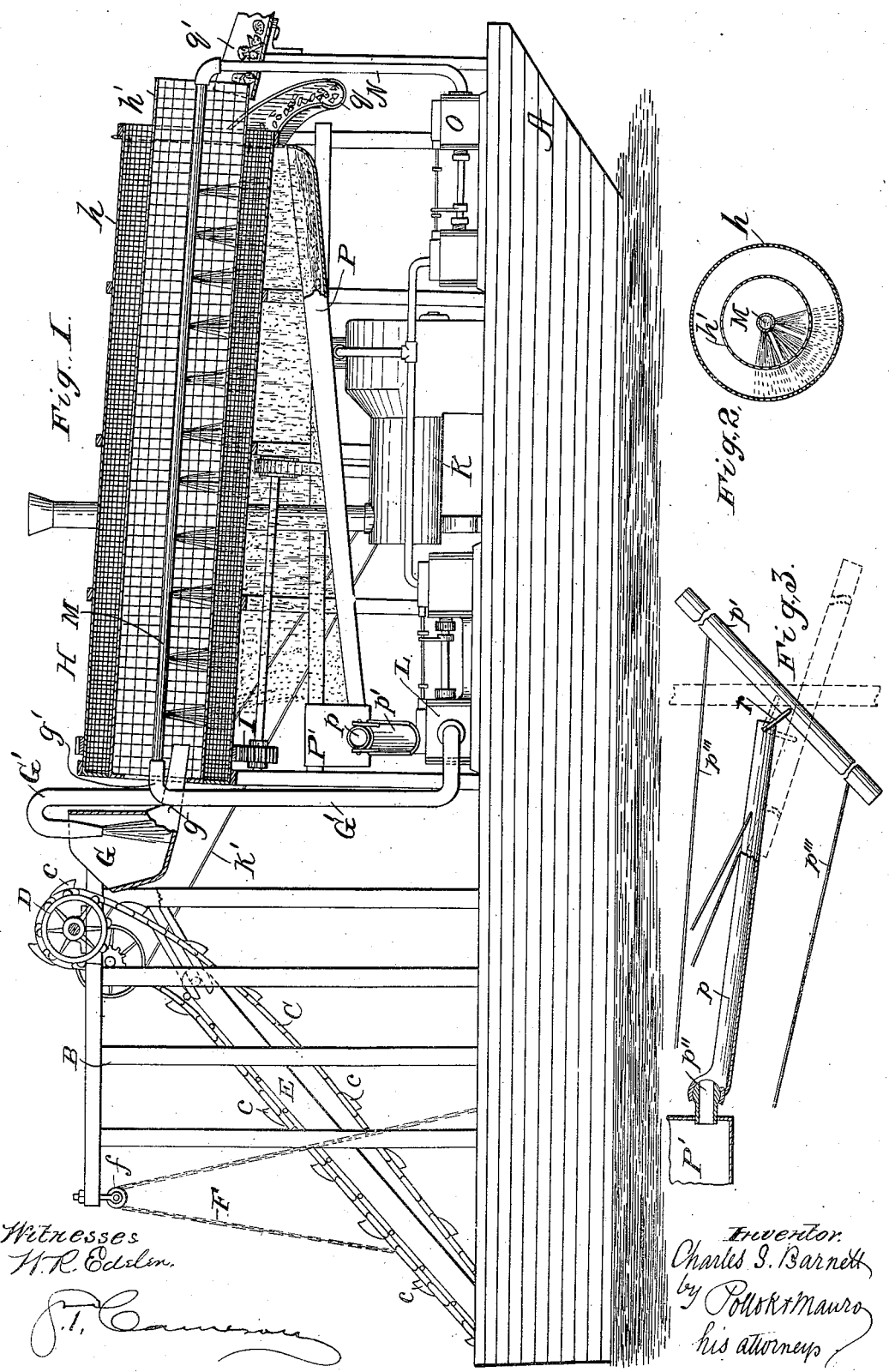

UNITED STATES PATENT OFFICE.

CHARLES S. BARNETT, OF WASHINGTON, DISTRICT OF COLUMBIA, ASSIGNOR TO THE COLUMBIA NATIONAL SAND DREDGING COMPANY, OF SAME PLACE.

APPARATUS FOR CLEANING OR SEPARATING SAND AND GRAVEL.

SPECIFICATION forming part of Letters Patent No. 615,667, dated December 13, 1898.

Application filed May 26, 1898. Serial No. 681,791. (No model.)

*To all whom it may concern:*

Be it known that I, CHARLES S. BARNETT, of Washington, District of Columbia, have invented a new and useful Improvement in Apparatus for Cleaning or Separating Sand and Gravel, which improvement is fully set forth in the following specification.

My invention relates to the art of cleaning and separating sand and gravel and grading the same as to fineness, and has for its object to provide an apparatus which will dig mixed sand and gravel from the sand-bank whether the same be in the bed of the river or elsewhere, deliver it to a washer, where it is freed from mud and other foreign matter, and thence conducted to a separating-screen, by which the sand and gravel are separated from each other and graded as to fineness.

To these ends the invention consists of a movable frame or support upon which is mounted a suitable elevating device for raising the combined sand and gravel from the sand-bank, a washing-box into which the material is delivered by the elevator and wherein it is violently agitated and thoroughly washed by a strong stream of water, which disintegrates the mass and frees it from the mud and dirt which is taken up by the water, a screen, preferably of the revoluble type, for separating the sand from the gravel, a double-acting spray device for keeping the meshes of the screen free from mud and forcing the cleaned sand through the interstices between the gravel and through the screen, and suitable conduits for conducting the separated gravel and the sand, together with the water, away from the screen to a suitable receptacle, where the sand is allowed to settle and the water is conducted away.

I have illustrated one form which my invention may assume in the accompanying drawings, in which—

Figure 1 is a side elevation, in partial section, of a device for dredging, washing, and separating sand and gravel from the beds of streams. Fig. 2 is a cross-section of the revoluble screen and spray-pipe, and Fig. 3 is a side elevation of the delivery-pipe with its distributing-chute.

A is a movable structure, here shown as a barge, and B is a framework on the barge upon which is mounted an endless chain C, bearing dredge-buckets $c$, the chain passing over sprocket-wheel D on the frame B and also over a suitable wheel (not shown) on the lower end of the spar-beam E, which beam E may be raised or lowered, as occasion may require, by means of the chain or rope F, reeved through the pulley $f$ and suitably connected to the beam E.

G is the washer-box, into which the dredge-buckets $c$ dump the mass of sand, gravel, and mud, and $g$ is a spout or conduit connecting the washing-box G with a screen H, here shown as a double revoluble screen, the outer section $h$ of which is of fine mesh and the inner section $h'$ of coarser mesh.

The bottom of the washer-box G and the spout $g$ slant downwardly toward the screen H, the spout extending so as to deliver all the washed material within the screen-section $h'$. The entire screen H is set on a gentle incline downward from the wash-box G and is caused to revolve in suitable bearings by means of the gearing I, driven from the engine K, as shown.

G' is a pipe through which a heavy stream of water is driven by the pump L and delivered with great force into the washer-box G, where it acts as an agitator, serving to thoroughly disintegrate and wash the sand and gravel previously delivered to the washer by the dredge. Suitably connected to the pipe G' is a smaller pipe M, passing through the screen H and connected at its opposite or lower end to a pipe N, through which water is driven by the pump O, so that two independent streams of water are forced into the pipe M, one coming from pump L through pipe G' and connections $g'$ and the other from the pump O through pipe N. Pipe M has a series of perforations throughout its length, through which water is delivered in jets, which serve to keep the screens from clogging with mud and other foreign matter which has previously been washed from the sand and gravel in the washer G. There is another important function of this spray device. As the screen revolves the mass of intimately-mixed sand and gravel turns over and over in the screen and gradually descends to the lower end thereof. The washed sand being wet packs in between the gravel filling the interstices, and but for the strong spray from the double-ended spray-pipe M much of the sand would pass with the gravel from the lower end of the screen-section $h$ into the chute $q$. The revolutions of the screen, however, constantly turn the mass of mixed sand and gravel over and over, and the strong spray effectually forces the sand out from among the gravel and through the screen-section $h$.

P is the chute or trough under the screen H, inclined in a direction the reverse of the screen and emptying into the box P', to which is connected a pipe $p$, extending out over the side of the barge and having a chute $p'$ pivoted thereto. The pipe $p$ may, if desired, be connected to the box P' by a universal joint $p''$ in order that it may be elevated out of the way when not in use or swung from side to side for the purpose of distributing the sand when in use. Thus if the cleaned sand or gravel were being delivered, as is usual, to a scow lying alongside of the dredge the pipe $p$ could be turned so as to deliver the same at either end or at any intermediate point desired. In order to provide for the distribution of the sand and gravel transversely of the scow being loaded, the chute $p'$ is employed. This chute is pivoted to the outer end of the pipe $p$ by means of a bail $r$, secured to the chute at a point substantially midway between its ends. Lines $p'''$ are connected to each end of the chute $p'$, the other ends of said lines being secured on board the barge. By means of these lines the delivery end of the chute $p'$ may be placed between the barge and the outer end of the pipe $p$, immediately under the outer end of such pipe or beyond the same, as may be desired. Suitable guy-ropes, as shown, are employed for adjusting the pipe $p$. By means of this delivery-pipe and the chute a very considerable saving is accomplished in the distribution of the load on the scow.

A suitable trough or spout $q$ is placed under the lower end of the screen-section $h$ and extended out over the side of the barge, and another chute or trough $q'$ is placed under the lower end of screen-section $h'$ and also extends overboard.

The operation of the device is as follows: The dredge C, having been set in operation by the engine K through the driving-belt K', elevates in the buckets $c$ mixed masses of sand, gravel, and mud, which are dumped into the washer G. In the meantime the pump L is forcing a powerful current of water through the pipe G' into the washer G, and this strong current of water serves to agitate the sand, gravel, and mud until the mass is entirely disintegrated, the mud taken up by the water, the sand and gravel clearly washed, and the whole delivered in a fluid state through the pipe $g$ to the screen H. Here the muddy water and the washed sand and gravel pass through the screen-section $h'$, while the coarser stones, shells, &c., are delivered at the lower end of the section $h'$ to the trough $q'$ and are conducted overboard. While the washed sand and gravel both pass readily through the screen-section $h'$, only the sand and water pass through the finer-meshed screen-section $h$, the washed gravel being delivered to the trough $q$, by which it may be conveyed to a conveniently-positioned scow. (Not shown.) The clean sand and muddy water pass through the screen-section $h$ and fall into the chute P, and by reason of the fluid condition of the mixed sand and water and the inclination of the chute it is forcibly delivered into the box P', thus preventing any tendency of the mud carried by the water to settle, and is thence conducted through the pipe $p$ and the spout $p'$ to any convenient receptacle, as a scow, to which the washed sand and water holding the mud in suspension are delivered, the sand settling clean and bright in the scow and the muddy water flowing overboard. There is a very positive tendency of the mud to stick to the screen-sections $h\ h'$, clogging up the meshes and materially interfering with the effective operation of the screen; but the strong jets of spray from the pipe M keep the screens free from mud, and by reason of the fact that this pipe M is supplied with water from both ends the spray is evenly distributed along the entire length of the screen, whereas if the water were supplied from one end only and the opposite end closed the spray would be effective only at that portion of the pipe near the closed end. It will thus be seen that the sand and gravel are first thoroughly washed in the washer G, the clean gravel delivered in one place, the clean sand in another, and the screen kept constantly free from clogging and in condition to effectively perform its functions at all times. It will be understood that while I have shown the double-ended spray-pipe M located in the axis of the revolving screen such location is not essential, as the pipe may be otherwise located, if desired, and it will also be understood that other forms of screens may be used or that a revoluble screen having a different number of sections might be employed. Furthermore, an open trough or chute may be substituted for the pipe $p$ without departing from the principle of my invention.

Having thus described my invention, what I claim as new, and desire to secure by Letters Patent, is—

1. In a sand and gravel separator, an elevating device, a washer composed of a wash-box and means for agitating the material therein, a separator for separating the washed sand and gravel, a spray-pipe open from end to end in proximity to the surface of the separator, means for forcing water into the opposite ends of said pipe, means conducting the washed material from the washer to the separator, and mechanism for operating the elevator, the washer and the separator, all combined in an organized mechanism, substantially as described.

2. In a sand and gravel separator, the combination of a screen, a spray-pipe open from end to end and in proximity thereto, and means for forcing water into the opposite ends of said pipe, substantially as described.

3. In a sand and gravel separator, an elevator, a separator, a washer between the elevator and separator, a spray-pipe open from end to end and in proximity to the separator, means for forcing water into opposite ends of said pipe, a chute or trough under the separator, a box into which said chute or trough empties, and a discharge-pipe leading from said box, all combined in an organized mechanism, substantially as described.

In testimony whereof I have signed this specification in the presence of two subscribing witnesses.

CHARLES S. BARNETT.

Witnesses:
 HENRY WELLS,
 REEVE LEWIS.